United States Patent Office 2,694,049
Patented Nov. 9, 1954

2,694,049

TITANIUM OXIDE AND TUNGSTEN OXIDE CONTAINING CATALYST

Peter William Reynolds and Laurence Roy Pittwell, Norton-on-Tees, England, assignors to Imperial Chemical Industries Limited, a corporation of Great Britain No Drawing. Application February 21, 1949, Serial No. 77,678

Claims priority, application Great Britain February 27, 1948

6 Claims. (Cl. 252—469)

This invention relates to catalysts which are particularly useful in hydration and dehydration reactions.

In co-pending U. S. Specification, Serial No. 762,794, now abandoned, there is described and claimed a process for the production of isopropanol by reacting water and propylene, at elevated temperatures, in the presence of a catalyst containing the be oxide of tungsten which has a formula approximating $W_1O_5$.

We have now found that catalysts which contain oxides of both tungsten and titanium in intimate admixture have markedly improved activity for the hydration of olefins and for the dehydration of alcohols.

According to the present invention, therefore, there are provided catalysts for the hydration of olefines or the dehydration of alcohols which comprise an intimate admixture of titanium oxide with a tungsten oxide, the composition of which approximates that of $W_2O_5$.

In this specification the expression "intimate admixture" is to be understood to mean the bringing together of the oxides of titanium and tungsten in close association by methods other than by the mechanical mixing of anhydrous titania with crystalline tungsten trioxide or tungstic acid.

The mere mixing of titanium dioxide with blue oxide of tungsten, tungsten trioxide, or tungstic acid before pelleting has been shown to produce only a slight increase in the activity of the tungsten compounds. Titanium oxide alone is relatively inactive.

The nature of the interaction of the intimate admixtures of titanium oxide and the tungsten oxide is not understood but the phenomenon is believed broadly to be that of promotion.

The catalysts of the present invention may be prepared in various ways, for example, by impregnating powdered, pelleted or extruded titania gel with ammonium paratungstate and heating in a reducing atmosphere (e. g. ethanol vapour or hydrogen) to convert the tungsten compound to what is approximately $W_2O_5$. The ammonium may be removed prior to reduction by ignition, but this is not essential; both steps may be carried out simultaneously. Owing to the low solubility of ammonium paratungstate it is, however, referred to use ammonium metatungstate. Decatungstates and orthotungstates may also be used.

Another procedure, which gives a product containing in the unreduced state approximately equimolar proportions of titanium dioxide ($TiO_2$) and tungsten trioxide ($WO_3$), is to add an aqueous solution of ammonium metatungstate to one of titanium tetrachloride under suitable conditions to produce a gel which is then dried and heated to drive off ammonium chloride and reduced in a reducing atmosphere. The catalysts of the present invention may also be prepared by the intermediate formation of a solution of a heteropolyacid or a heteropolyacid salt containing titanium and tungsten in the acid radical, for example an ammonium titanotungstate or an ammonium tungstotitanate which is sprayed upon, or impregnated into, a suitable support, for example silica or titania, and then heated to drive off the ammonia and reduced in a reducing atmosphere.

The catalysts may also be prepared by impregnating titania with silicotungstic acid or by intimately mixing titania hydrogel with aqueous ammonium metatungstate or ammonium paratungstate and subsequently heating in a reducing atmosphere to reduce the tungsten compounds to the oxide. Commercial rutile or anatase may, if desired, be used instead of titania gel.

It is preferable in all cases to avoid the use or presence of alkali metal compounds, or, if they have been used or are present, to effect very completely the removal of any residual alkali metals, as these are powerful poisons for the catalysts of this invention.

It is also a feature of the present invention to provide a process for the dehydration of alcohols to produce the corresponding olefines and/or ethers by passing the alcohol at elevated temperature and at atmospheric or superatmospheric pressure over a catalyst comprising an intimate admixture of titanium oxide with a tungsten oxide, the composition of which approximates that of $W_2O_5$.

It is a further feature of the invention to provide a process for the hydration of olefines to produce the corresponding alcohols by reacting the olefines with water at elevated temperature and pressure in the presence of a catalyst comprising an intimate admixture of titanium oxide with a tungsten oxide, the composition of which approximates that of $W_2O_5$.

The invention is further illustrated by the following examples.

Example 1

Pelleted titania gel was prepared as follows:

4.75 kilograms of titanium tetrachloride were cautiously diluted by the addition of 100 mls. of distilled water, while being stirred. To this was added, with stirring, a slight excess of 0.88 aqueous ammonia to a final pH value of 9. The precipitated hydrogel was washed free of ammonium chloride, dried at 120° C., and then calcined for 4 hours at 400° C. The product was ground to pass 100 B. S. mesh sieve, i. e. 150$\mu$, and, after the addition of 2% of graphite as a lubricant, was pelleted in the form of $\frac{1}{8}'' \times \frac{1}{8}''$ cylinders under a pressure of 38 tons per square inch.

Example 2

A pelleted tungsten oxide on titania gel was prepared as follows:

3 kilograms of titania prepared as in Example 1 were mixed into a paste with 1.3 kilograms of ammonium metatungstate in 1.35 litres of distilled water. The paste was dried at 120° C., and after the addition of 3% of graphite as a pelleting lubricant, was pelleted in the form of $\frac{1}{8}'' \times \frac{1}{8}''$ cylinders under a pressure of 32 tons per square inch. These pellets were reduced in ethanol vapour at 250° C.

Example 3

The product of Example 1, the unreduced product of Example 2 and a sample of similar pellets of tungstic acid ($H_2WO_4$) were charged in turn into a glass reactor and reduced in ethanol vapour at 300° C. After the reduction was complete the catalysts were tested for their efficiency in the dehydration of ethanol at 300° C., using a liquid space velocity of 4 hrs.$^{-1}$, that is, 4 volumes of ethanol per volume of catalyst space per hour. The pass yields of ethylene and ether obtained were as follows:

| | Percent pass yield | |
|---|---|---|
| | Ethylene | Ether |
| Titania gel as prepared in Example 1 | 2.9 | 6.1 |
| 20% tungsten as oxide on titania gel as prepared in Example 2 | 55.6 | 13.7 |
| Tungstic acid ($H_2WO_4$) | 49.0 | 12.4 |

Example 4

450 ml. samples of the same materials as in Example 3 were reduced in ethanol vapour at 300° C. and at atmospheric pressure and tested in propylene hydration at 230° C. and 190° C. under 250 ats. total pressure using a constant feed of 0.5 litre per hour of water and 1.0 litre (under 250 ats.) per hour of propylene. The pass yields of isopropanol obtained were as follows:

| Catalyst | Temp., °C. | Percent Pass Yield Isopropanol |
|---|---|---|
| Titania gel prepared as in Example 1 | 230 | Less than 2. |
| Tungstic acid ($H_2WO_4$) | 230 | 12. |
|  | 190 | 6. |
| 20% tungsten as oxide on titania prepared as in Example 2 | 230 | 26.0. |
|  | 190 | 16.5. |

A small amount of polymerisation occurred in each case, but the loss of propylene in this manner was not excessive. The very high activity of the tungsten oxide on titania catalyst is evident from these results. It exhibited no evidence of deterioration after 200 hours' continuous processing, actually improving somewhat during the first 60 hours of operaton to the activity shown in the above table.

Example 5

A highly active tungsten oxide-titanium oxide catalyst which contained approximately equimolar proportions of titanium dioxide and tungsten trioxide or their reduction products was prepared as follows:

0.57 kg. of titanium tetrachloride was slowly and cautiously added to distilled water to produce a solution containing 100 gms. of $TiCl_4$ per 100 mls. of solution. 3.37 kgs. of ammonium meta-tungstate $$((NH_4)_2W_4O_{13}.8H_2O)$$

were dissolved in 3 litres of distilled water and slowly added to the aqueous titanium tetrachloride with vigorous stirring. The mixture gelled on standing. The jelly was dried at 120° C. and ignited for 12 hours at 250° C. and 30 hours at 400° C. to drive off the ammonium chloride. The product was crushed to pass 16 B. S. mesh, i. e. about 1000μ and, after the addition of 2% of graphite as lubricant, was pelleted under a pressure of 47 tons per square inch to 1/8" x 1/8" cylinders. The product was reduced in ethanol vapour at 300° C. before use.

Example 6

A concentrated aqueous solution of ammonium titanotungstate was prepared as follows:

One gram-molecular weight of ammonium paratungstate was dissolved in distilled water and one quarter of a gram-molecular weight of quickly washed, freshly precipitated titania hydrogel added to the solution. The mixture was boiled under reflux for 48 hours and the small amount of residual titania filtered off. The solution of ammonium titanotungstate was concentrated by evaporation to a glassy mass.

This product may be redissolved in water and sprayed upon or impregnated into a suitable support, or the glass may be further ignited at 400° C. to drive off the ammonia, and the residue, after the addition of 2% of graphite as lubricant, was pelleted under a pressure of 52 tons per square inch to 1/8" x 1/8" cylindrical pellets. The product in either case is reduced before use as in Example 5.

We claim:

1. A process for preparing a catalyst suitable for use in reactions altering the content of the elements of water in chemically equivalent quantities forming parts of the molecule of organic compounds comprising impregnating particulate titania gel with a compound selected from the group consisting of ammonium paratungstate, ammonium decatungstate, ammonium orthotungstate and ammonium metatungstate, and heating the product so obtained in a reducing atmosphere to convert the tungsten compound into an oxide of tungsten, the composition of which approximates that of $W_2O_5$.

2. A process for preparing a catalyst suitable for use in reactions altering the content of the elements of water in chemically equivalent quantities forming parts of the molecule of organic compounds comprising intimately mixing titania hydrogel with an aqueous ammonium tungstate compound and subsequently heating said intimate admixture to convert the tungsten compound into an oxide of tungsten, the composition of which approximates that of $W_2O_5$.

3. A process for preparing a catalyst suitable for use in reactions altering the content of the elements of water in chemically equivalent quantities forming parts of the molecule of organic compounds comprising impregnating titania with silicotungstic acid, subsequently heating the product so obtained to convert the tungsten compound to a tungsten oxide, and heating the product in a reducing atmosphere to reduce the tungsten oxide to one whose composition approximates that of $W_2O_5$.

4. A process for preparing a catalyst suitable for use in reactions altering the content of the elements of water in chemically equivalent quantities forming parts of the molecule of organic compounds comprising forming an alkali metal free intimate admixture of a titanium oxide and a tungsten-containing compound selected from the group consisting of an ammonium tungstate and silicotungstic acid and thereafter heating the said mixture in a reducing atmosphere to convert the tungsten compound into an oxide of tungsten the composition of which approximates that of $W_2O_5$.

5. The process of claim 1 wherein the tungsten oxide is in the form of a dried gel obtained by adding an aqueous solution of ammonium metatungstate to an aqueous solution of titanium tetrachloride and thereby producing a gel, drying said gel, and heating said gel to drive off ammonium chloride.

6. A process as in claim 4 wherein said alkali metal free intimate admixture is subjected to a further step of pelleting by subjecting said intimate admixture to a pressure of at least approximately 50 tons per square inch.

References Cited in the file of this patent

UNITED STATES PATENTS

| Number | Name | Date |
|---|---|---|
| Re. 20,739 | Metzger | May 24, 1938 |
| 1,314,952 | Ellis | Sept. 2, 1919 |
| 1,682,242 | Patrick | Aug. 28, 1928 |
| 1,773,273 | Miller | Aug. 19, 1930 |
| 1,977,633 | Horsey | Oct. 23, 1934 |
| 2,016,169 | Griffith | Oct. 1, 1935 |
| 2,132,613 | Fracon | Oct. 11, 1938 |
| 2,157,965 | Pogratz | May 9, 1939 |
| 2,209,699 | Mastrangelo | July 30, 1940 |
| 2,274,634 | Heard | May 3, 1942 |
| 2,328,059 | Craig | Aug. 31, 1943 |
| 2,345,600 | Heard | Apr. 4, 1944 |
| 2,415,878 | Hale | Feb. 18, 1947 |
| 2,432,286 | Claussen | Dec. 9, 1947 |
| 2,450,675 | Marisic | Oct. 5, 1948 |